July 24, 1934.    E. M. DIXON ET AL    1,967,296
METHOD OF AND APPARATUS FOR TESTING ELECTRICAL DEVICES
Filed March 12, 1931    2 Sheets-Sheet 1

INVENTORS
E. M. DIXON
F. KONICEK
BY E. R. Nowlan
ATTORNEY

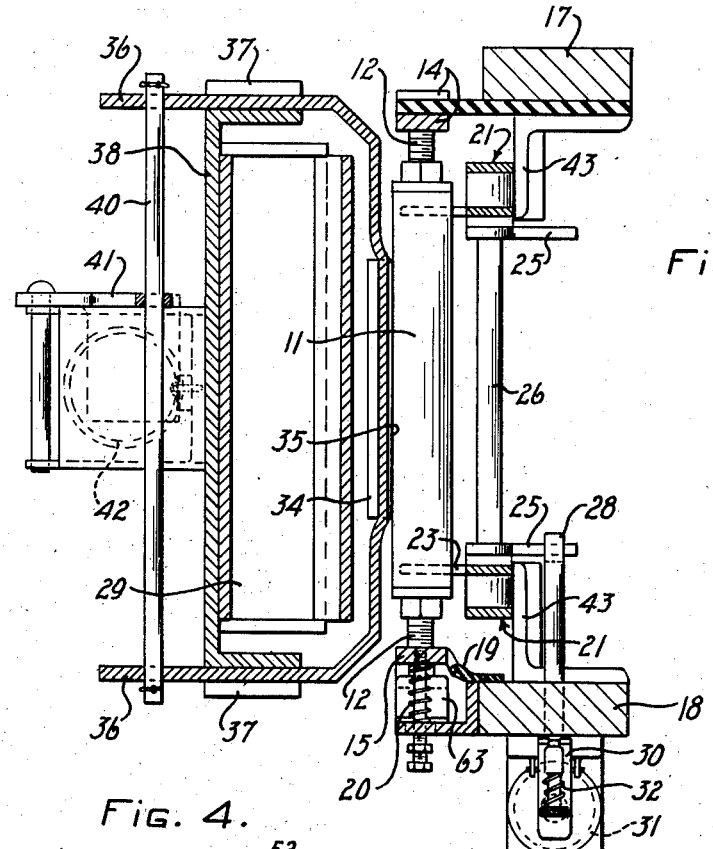
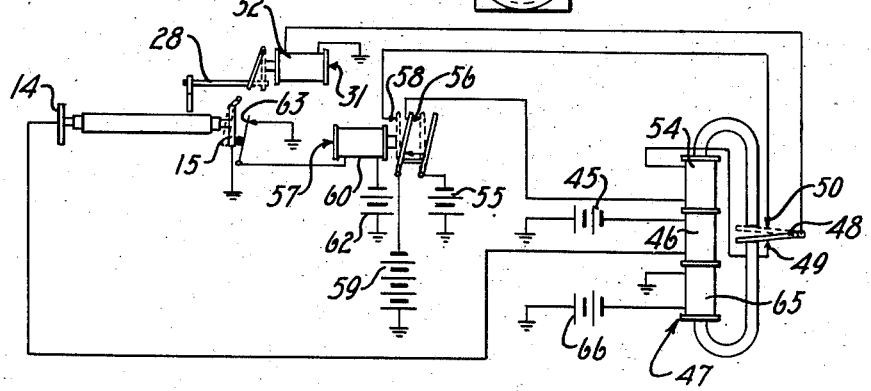
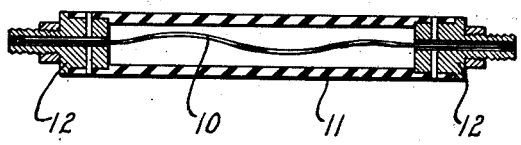
INVENTORS
E. M. DIXON
F. KONICEK
BY E. R. Nowlan
ATTORNEY Patented July 24, 1934

1,967,296

UNITED STATES PATENT OFFICE 1,967,296

METHOD OF AND APPARATUS FOR TESTING ELECTRICAL DEVICES

Earl M. Dixon and Frank Konicek, Baltimore, Md., assignors to Western Electric Company, Incorporated, New York, N. Y., a corporation of New York Application March 12, 1931, Serial No. 521,973

9 Claims. (Cl. 209—81)

This invention relates to a method of and apparatus for testing electrical devices, and particularly to a method of and apparatus for testing electrical fuses.

Electrical devices are usually subjected to one or more tests before being placed into service. For example, electrical fuses are sometimes tested by passing a low potential electrical current through the fuse element thereof to detect breakages or defective connections therein. It has been found that such defects were not always detected by the tests employed heretofore due to the fact that in some instances the broken portions or defective connections of the fuse element were momentarily in electrical contact during the test.

An object of the invention is to provide a simple, inexpensive and efficient method of and apparatus for testing electrical devices.

The invention contemplates the provision of a method of and apparatus for testing electrical devices, wherein the device is subjected to an electrical current and is simultaneously vibrated and/or rotated to thereby test the device as to its conductivity as well as its physical characteristics. In accordance with one embodiment of the invention, the continuity of the fuse element of an electrical fuse and other characteristics thereof are tested by passing a low potential electrical current through the fuse element thereof and simultaneously rotating and vibrating the fuse to separate broken or defective portions of the fuse element and thereby control the actuation of a device for effecting the ejection of a defective fuse.

A more complete understanding of the invention will be had from the following detailed description when read in conjunction with the accompanying drawings, wherein Fig. 1 is a fragmentary side elevation view, partly in section, of an apparatus embodying the features of the invention and by means of which the method may be practiced.

Fig. 3 is a plan sectional view on line 3—3 of Fig. 1;

Fig. 4 illustrates, diagrammatically, an electrical operating circuit of the apparatus, and Fig. 5 is a longitudinal section of one type of fuse adapted to be tested by the method and apparatus of the invention.

Figure 1:
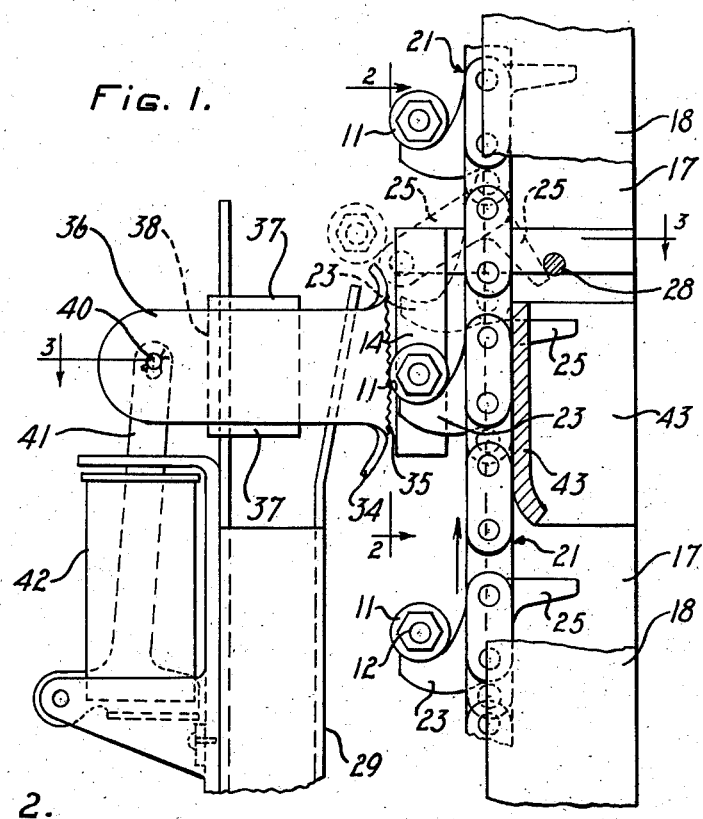

One embodiment of the invention is herein illustrated and described in conjunction with the testing of electrical fuses of a type commonly employed in telephone systems. A fuse of this type is illustrated in the drawings (Fig. 5) and comprises a fuse element 10 enclosed in an insulating sleeve 11 and connected at opposite ends to terminals 12—12 secured to opposite ends of the insulating sleeve. The present invention is concerned with the testing of the continuity of the fuse element 10 as well as the connections between the fuse elements and the terminals 12.

As shown in the drawings, the fuses are advanced in spaced relationship between a pair of spaced contact plates 14 and 15 adapted to make electrical contact with opposite end terminals 12 of the fuse, the contact plates being connected in an electrical testing circuit hereinafter described. The contact plate 14 is rigidly secured to and insulated from a vertical supporting standard 17 and the contact plate 15 is pivoted or hinged at 19 to a similar standard 18 and is yieldably urged toward the contact plate 14 by an adjustable coil spring 20. This construction insures a good electrical connection between the contact plates and the end terminals of the fuse and also compensates for the variations in the overall length of the fuse.

Figure 2:
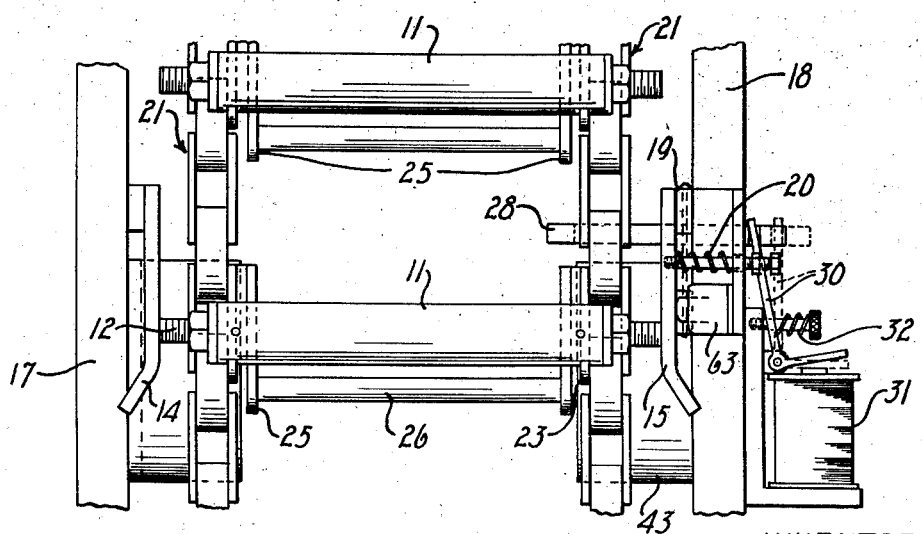
Fig. 2 is a vertical sectional view on line 2—2 of Fig. 1.

Any suitable means may be employed for receiving the fuses from a supply source (not shown) and advancing them in parallel spaced relationship between the contact plates 14 and 15. In the present embodiment of the invention, this means comprises a pair of spaced endless conveyor chains 21—21, portions of which are shown in Figs. 1 and 2 of the drawings. These conveyor chains are arranged to travel around sprocket wheels (not shown) at the same speed and in the direction indicated by the arrow (Fig. 1). Every second link of each of the conveyor chains is formed with a laterally extending hook 23 for receiving and carrying the fuses past the contact plates.

Mechanism is provided for automatically ejecting such fuses as do not pass the test. Adjacent to each of the hooks 23 a bell crank lever 25 is pivotally mounted. The long arms of each of the corresponding levers on the two conveyor chains are connected by a rod 26, whereby the levers are adapted to swing about their pivots as a unitary structure. The short arms of the levers project rearwardly on the ascending side of the conveyor chains and are adapted, normally, to be engaged by a pin 28. This pin, unless withdrawn, obstructs the bell crank levers, causing them to rock about their pivots, as indicated in dotted outline in Fig. 1, whereupon the long arms thereof push the fuses out of the hooks 23 from which they drop down a chute 29 into a suitable receptacle (not shown) located beneath the apparatus. The pin, however, is withdrawn by mechanism hereinafter described whenever a perfect fuse passes between the contact plates, whereby such fuse is not ejected, but is delivered by the conveyor chains to another receptacle or receiving station (not shown).

The ejector pin 28 is horizontally slidable in the standard 18 and is pivotally connected to the outer end of an armature 30 of a relay 31. When a perfect fuse passes between the contact plates 14 and 15, the relay 31 is energized, thus moving its armature to the right (Fig. 2) against the opposing action of a coil spring 32 whereby the ejector pin is withdrawn out of the path of bell crank lever 25 and the fuse is not ejected.

In accordance with a feature of the present invention, mechanism is provided for rotating and simultaneously vibrating or tapping the fuses while they pass between the contact plates, whereby loose or defective end connections, as well as broken portions of the fuse element, are separated to thereby interrupt the flow of current through the fuse and thus effect the ejection of the fuse in the manner hereinafter described. The mechanism for rotating and vibrating the fuses while under test consists of a plate 34 having a notched or corrugated face 35 for engaging and thereby rotating the fuses as they pass between the contact plates. Arms 36—36 extending rearwardly from opposite ends of the plate 34 are slidably supported in channel guideways 37—37 formed at opposite ends of a bracket 38 attached to the chute 29. The arms 36 are interconnected at their outer ends by a rod 40 to which is pivotally connected a vibrating armature 41 of an electromagnet or relay 42. The vibratory or tapping motion of the armature is transmitted through rod 40, arms 36 and plate 34 to the fuses under test. The conveyor chains are engaged by bearing plates 43—43 extending from the supporting standards opposite the vibratory plate 34. These bearing plates serve to restrict lateral movement of the fuse due to the vibratory motion imparted thereto by plate 34. It is to be understood, of course, that any other suitable means may be employed for rotating and vibrating the fuses while under test.

The electrical testing circuit and associated apparatus will now be described. Referring to Fig. 4, it will be observed that contact plate 15 is grounded and contact plate 14 is connected to one end of a winding 46 of a relay 47, the opposite end of said winding being connected to a suitable source of low potential current, such as a grounded battery 45. Relay 47 has an armature 48 movable between and adapted to contact with either of two fixed contacts 49 and 50. Armature 48 is connected to one end of winding 52 of ejector relay 31, above referred to, the opposite end of winding 52 being grounded. Contact 49 is connected to one end of a "holding" winding 54 of relay 47, the opposite end of said winding being adapted to be connected to a grounded battery 55 through a contact 56 of a slow operating relay 57. Contact 50 of relay 47 is adapted to be connected to a grounded battery 59 through a second contact 58 of relay 57. Contacts 56 and 58 of relay 57 are opened and closed simultaneously. Winding 60 of this relay is connected in an electrical circuit including a battery 62 and a normally open switch 63, the switch being adapted to be closed by the outward movement of contact plate 15 upon the insertion of a fuse between contact plates 14 and 15. A "bias" winding 65 of relay 47 is connected to a battery 66 and serves to normally hold contact 49 closed, as shown, thus conditioning the circuit including contact 56 of relay 57. The closing of contact 56 completes this circuit which may be traced as follows: From grounded battery 55 through contact 56, "holding" winding 54 and contact 49 of relay 47, and then through winding 52 of ejector relay 31 to ground. Battery 55 is insufficient to energize ejector relay 31 and consequently this relay cannot be operated when contact 49 of relay 47 is closed. However, with contact 50 of relay 47 closed, the energization of relay 57 connects winding 52 of ejector relay to battery 59, which battery is sufficient to operate the ejector relay.

The operation of the apparatus is as follows: The fuses are carried upwardly in spaced relationship by the hooks 23 of the conveyor chains. Upon entering between contact plates 14 and 15, the fuse moves contact plate 15 to the right (Fig. 2), thereby closing switch 63 and energizing relay 57. At the same time, the fuse element, if continuous, bridges the gap between the contact plates, thus energizing winding 46 of relay 47. This relay operates before relay 57 and its winding 46 is opposite to and over-powers "bias" winding 65, thus moving armature 48 from contact 49 to contact 50. Consequently the subsequent operation of relay 57 connects ejector relay 31 to battery 59, whereby this relay operates to withdraw ejector pin 28.

If the fuse under test is not defective, the circuit through winding 46 of relay 47 remains closed during the complete test, and consequently ejector pin 28 is maintained in its withdrawn position by ejector relay 31 until the associated bell crank lever 25 has passed the ejector pin 28, whereby the fuse is not ejected. However, if the fuse under test is defective, the broken portions or defective connections of the fuse element are separated by the rotary and vibratory motion imparted to the fuse by plate 34. This opens the circuit through winding 46 of relay 47, thus permitting "bias" winding 65 to move armature 48 from contact 50 to contact 49, whereby "holding" winding 54 is placed in series with winding 52 of ejector relay 31. Also, since battery 55 is insufficient to operate ejector relay 31, ejector pin 28 will not be withdrawn, or if previously withdrawn, it will be returned to its ejecting position by spring 32. "Bias" winding 65 aided by holding winding 54 cannot be over-powered by winding 46, should the circuit through this winding be re-established through the fuse under test, and consequently, the fuse is ejected. Upon the fuse leaving the contact plates 14 and 15, the testing circuit is automatically reset for testing the next fuse.

From the above description, it will be apparent that the invention provides a simple and efficient method of testing electrical devices by which defects not detectable by tests employed heretofore are now readily and quickly detected.

It is to be understood that the invention is not limited to the specific embodiment thereof herein illustrated and described, except insofar as is defined by the appended claims.

What is claimed is:

1. The method of testing electrical devices containing conductive elements, which comprises moving an electrical device through a predetermined path and simultaneously rotating and vibrating the device and subjecting it to an electrical current.

2. The method of testing the continuity of a fuse element of an electrical fuse, which comprises moving the fuse through a predetermined path, passing an electrical current through the fuse element during such movement, and simultaneously rotating and vibrating the fuse to separate broken portions of the fuse element and thereby interrupt the flow of current therethrough.

3. In an apparatus for testing a fuse element of an electrical fuse, means for continuously advancing the fuse, means for passing an electrical current through the fuse element during such advancement, and a member frictionally engaging the fuse for simultaneously rotating and vibrating the fuse to separate defective connections of the fuse element and thereby interrupt the flow of current therethrough.

4. In an apparatus for testing the continuity of an electrical device, means for passing an electrical current through the device, means for simultaneously rotating the device to separate broken portions thereof and thereby interrupt the flow of current through the device, means responsive to an interruption in the flow of current through the device for ejecting the device, means responsive to a flow of current through the device for rendering the ejecting means inoperative, and means for rendering the last mentioned means inoperative upon the re-establishment of the current flow through the device after an interruption of said current flow.

5. In an apparatus for testing electrical devices, a movable element having members for supporting the devices, means for rotating and vibrating the devices on the supporting members, contacts for electrically engaging the devices, means for passing an electrical current through the devices, means for ejecting the devices from the supporting means, and means responsive to an interruption in the flow of current to render the ejecting means operative.

6. In an apparatus for testing electrical fuses, a conveyor provided with members for supporting a fuse, a member frictionally engaging the fuse for producing rotation thereof relative to the conveyor, contact means for connecting the fuse into an electrical circuit, means for passing an electrical current through the circuit while the fuse is being rotated, pivotally mounted means for ejecting a fuse failing to pass a continuous current, and means responsive to an interruption in the electrical current for rendering the ejecting means operative.

7. In an apparatus for testing electrical devices, a conveyor having elements for supporting the devices, a member having a corrugated surface frictionally engaging the devices to produce rotation of the devices, means for oscillating the member to produce vibration of the devices, and means for passing an electrical current through the devices.

8. In an apparatus for testing electrical devices, means for supporting an electrical device, means for rotating the device relatively to the supporting means, means for passing an electrical current through the device while being rotated, a lever pivotally carried by the supporting means and having a plurality of arms, a pin slidable into the path of one of the arms of a lever to rock the lever and cause another arm thereof to eject the electrical device from the supporting means, and means responsive to an interruption of the electrical current for moving the pin into the path of an arm of the lever.

9. In an apparatus for testing electrical fuses, a plurality of spaced electrical contact members, a conveyor movable between the contact members and provided with hooks for supporting a fuse and carrying it into engagement with the contact members, means for passing an electrical current through the fuse, an oscillatable member having a corrugated surface frictionally engaging the fuse to produce rotation and vibration thereof, pivotally mounted levers carried by the conveyor for ejecting the fuse therefrom, a pin movable into the path of the lever for causing the lever to eject the fuse, and means responsive to an interruption of the electrical current for moving the pin into the path of the lever.

EARL M. DIXON.
FRANK KONICEK.